(12) United States Patent
Yang

(10) Patent No.: US 9,170,972 B2
(45) Date of Patent: Oct. 27, 2015

(54) DATA TRANSMITTING DEVICE HAVING SERIAL ADVANCED TECHNOLOGY ATTACHMENT DEVICE EXPANSION FUNCTION AND SERIAL ADVANCED TECHNOLOGY ATTACHMENT MODULE THEREOF

(71) Applicant: Meng-Liang Yang, Shenzhen (CN)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 283 days.

(21) Appl. No.: 13/686,945

(22) Filed: Nov. 28, 2012

(65) Prior Publication Data

US 2013/0290588 A1 Oct. 31, 2013

(30) Foreign Application Priority Data

Apr. 26, 2012 (CN) .......................... 2012 1 0125649

(51) Int. Cl.
*G06F 13/00* (2006.01)
*G06F 13/40* (2006.01)

(52) U.S. Cl.
CPC .......... *G06F 13/4068* (2013.01); *G06F 13/409* (2013.01)

(58) Field of Classification Search
CPC .... G06F 13/409; G06F 13/481; G06F 1/9411
USPC ...................... 710/300–308, 104–110, 62–72
See application file for complete search history.

(56) References Cited

U.S. PATENT DOCUMENTS

| 5,475,854 | A | * | 12/1995 | Thomsen et al. ................ 710/23 |
| 6,845,409 | B1 | * | 1/2005 | Talagala et al. .................. 710/20 |
| 7,237,041 | B2 | * | 6/2007 | Hatte ................................ 710/3 |
| 7,983,032 | B2 | * | 7/2011 | Walker et al. ............. 361/679.33 |
| 2005/0027900 | A1 | * | 2/2005 | Pettey ............................. 710/22 |
| 2007/0022228 | A1 | * | 1/2007 | Hicks et al. ..................... 710/51 |
| 2007/0294572 | A1 | * | 12/2007 | Kalwitz et al. .................... 714/9 |
| 2010/0241799 | A1 | * | 9/2010 | Schuette ....................... 711/104 |
| 2012/0042112 | A1 | * | 2/2012 | Thomas et al. ............... 710/313 |
| 2013/0038999 | A1 | * | 2/2013 | Tian et al. ................ 361/679.41 |
| 2013/0039016 | A1 | * | 2/2013 | Wu et al. ....................... 361/729 |
| 2013/0054847 | A1 | * | 2/2013 | Cho et al. ........................ 710/38 |

\* cited by examiner

*Primary Examiner* — Raymond Phan
(74) *Attorney, Agent, or Firm* — Novak Druce Connolly Bove + Quigg LLP

(57) ABSTRACT

A serial advanced technology attachment (SATA) module includes a number of circuit boards and a number of SATA devices. Each of the circuit boards includes an expansion microchip. The expansion microchip includes an input terminal, an output terminal and an expansion terminal. The expansion microchips are electrically connected in series with the input terminal of one expansion microchip connecting to the expansion terminal of another expansion microchip. The input terminal of a front expansion terminal positioned at a first end of the expansion microchips is configured to connect to a SATA controller. Each of the SATA devices is electrically connected to the output terminal of one expansion microchip and configured to transmit data with the SATA controller by the corresponding expansion microchip.

10 Claims, 2 Drawing Sheets

DATA TRANSMITTING DEVICE HAVING SERIAL ADVANCED TECHNOLOGY ATTACHMENT DEVICE EXPANSION FUNCTION AND SERIAL ADVANCED TECHNOLOGY ATTACHMENT MODULE THEREOF

BACKGROUND

1. Technical Field

The disclosure generally relates to data transmitting devices, and particularly to a data transmitting device having a serial advanced technology attachment (SATA) device expansion function and a SATA assembly thereof.

2. Description of Related Art

A typical main board 100 of a computer commonly includes a SATA controller 11 is shown in FIG. 2. The SATA controller 11 includes a plurality of SATA interfaces 111. Each SATA interface 111 is configured to connect a corresponding SATA device 200 (e.g., a hard disk or a DVD drive, etc.) by a corresponding SATA bus to the SATA controller 11. Thus, the SATA controller 11 and the SATA devices 200 transmit data with each other.

However, the number of the SATA interfaces 111 is limited, commonly is four. When a large number of the SATA devices 200 (e.g. more than four) are needed to connect to the main board 100, more than one SATA controllers 11 are required to install on the main board 100 which may occupy layout space of the main board 100 and also increase cost of the main board 100.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
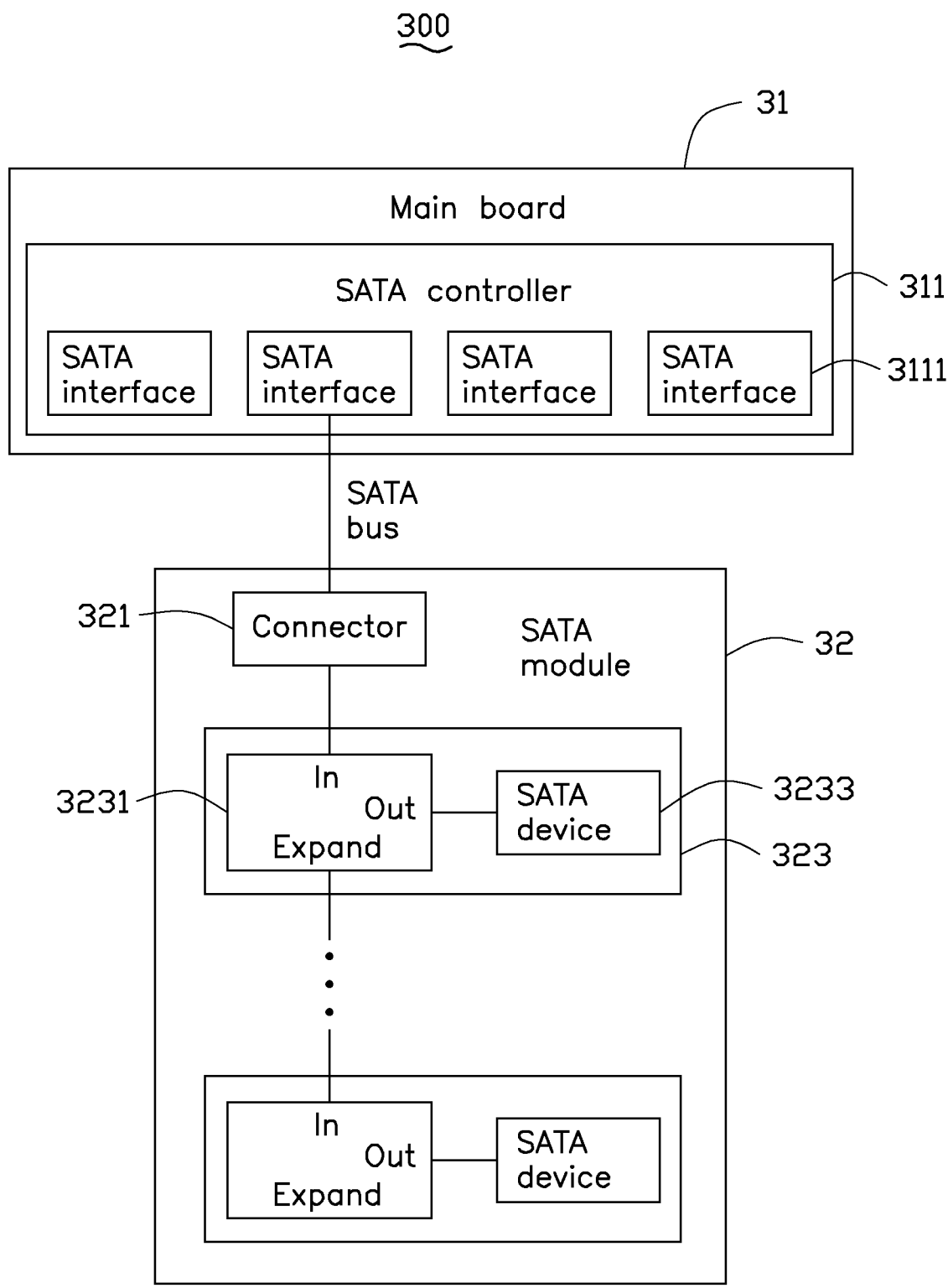
FIG. 1 is a block diagram of a data transmitting device, according to an exemplary embodiment of the disclosure.
Figure 2:
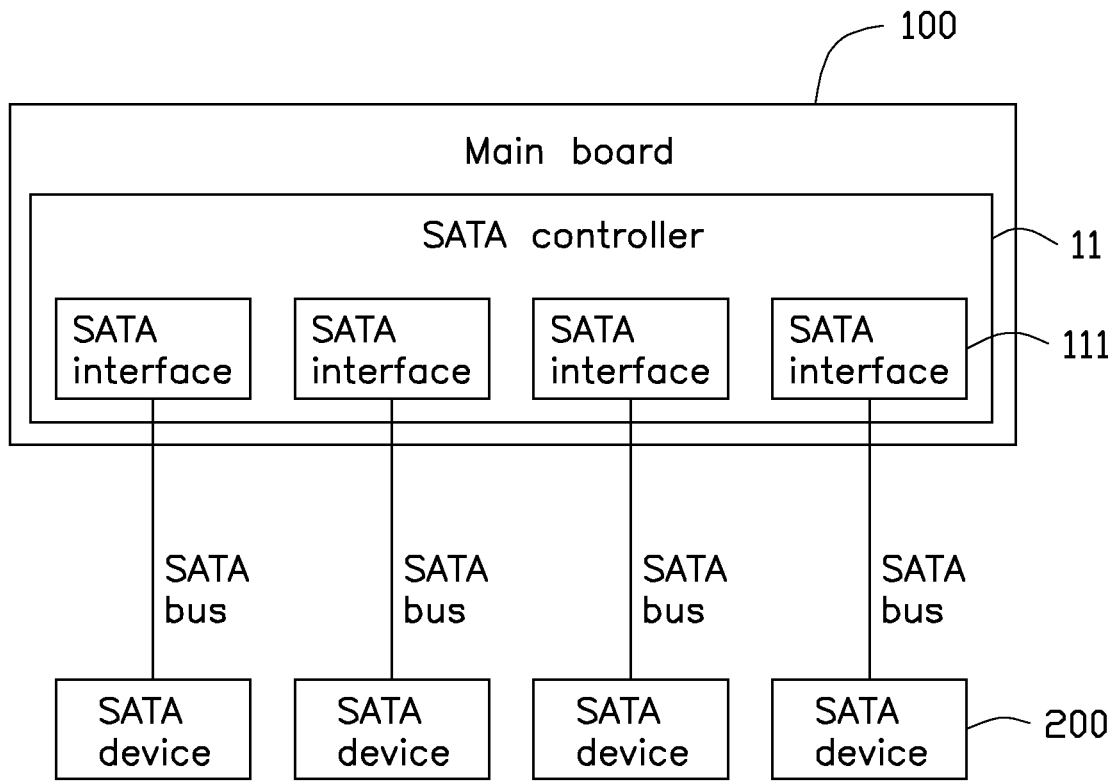
FIG. 2 is a block diagram of a typical data transmitting device.

FIG. 1 is a block diagram of a data transmitting device 300, according to an exemplary embodiment of the disclosure. The data transmitting device 300 includes a main board 31 and a SATA module 32 electrically connected to the main board 31 to transmit data with the main board 31.

The main board 31 includes a SATA controller 311 installed on the main board 31. The SATA controller 311 includes a plurality of SATA interfaces 3111. The SATA module 32 is configured to connect one of the SATA interfaces 3111 to transmit data with the SATA controller 311.

The SATA module 32 includes a connector 321 and a plurality of circuit boards 323 electrically connected in series. The connector 321 is configured to connect to one of the SATA interface 3111 via a SATA bus and establish a connection between the SATA module 32 and the main board 31.

Each circuit board 323 includes an expansion microchip 3231 and a SATA device 3233 electrically connected to the expansion microchip 3231. The SATA device 3233 may be a hard disk or a CD drive, for example.

Each expansion microchip 3231 includes an input terminal In, an output terminal Out, and an expansion terminal Expand. The expansion microchips 3231 are electrically connected in series with the expansion terminal Expand of one expansion microchip 3231 electrically connecting to the input terminal In of another expansion microchip 3231. The input terminal In of an front expansion microchip 3231 (i.e. the expansion microchip 3231 positioned at first end of the expansion microchips 3231) is electrically connected to the connector 321 and further electrically connected to the main board 31 by the connector 321. The expansion terminal Expand of a rear expansion microchip 3231 (i.e., the expansion microchip 3231 positioned at second end of the expansion microchips 3231) is idled.

The output terminal out of each extended microchip 3231 is electrically connected to the corresponding SATA device 3233.

To use the data transmitting device 300, the connector 321 is electrically connected to one of the SATA interface 111 by the SATA bus so that the SATA module 32 is electrically connected to the SATA controller 311. The multiple SATA devices 3233 can transmit the data with the SATA controller 311 by the expansion microchips 3231 and the connector 321.

Therefore, the number of the SATA devices 3233 is expanded without occupying layout space of the main board 31 or increasing the cost of the main board 31.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A serial advanced technology attachment (SATA) module, comprising:

a plurality of circuit boards, each of the circuit boards comprising an expansion microchip, each of the expansion microchips comprising an input terminal, an output terminal and an expansion terminal; the expansion microchips electrically connected in series with the input terminal of one expansion microchip connected to the expansion terminal of another expansion microchip, the input terminal of a front expansion microchip positioned at a first end of the expansion microchips configured to connect to a SATA controller; and a plurality of SATA devices, each of the SATA devices electrically connected to the output terminal of one expansion microchip and configured to transmit data with the SATA controller by the corresponding expansion microchip.

2. The SATA module of claim 1, further comprising a connector connected between the front expansion microchip and the SATA controller.

3. The SATA module of claim 1, wherein the SATA device is selected from one of the group consisting of a hard disk and a DVD drive.

4. A data transmitting device, comprising:

a main board comprising a serial advanced technology attachment (SATA) controller; and an SATA module, comprising:

a plurality of circuit boards, each of the circuit boards comprising an expansion microchip, each of the expansion microchips comprising an input terminal, an output terminal, and an expansion terminal; the expansion microchips electrically connected in series with the input terminal of one expansion microchip connected to the expansion terminal of anther expansion microchip, the input terminal of a front expansion terminal positioned at a first end of the expansion microchips electrically connected to a SATA controller; and a plurality of SATA devices, each of the SATA devices electrically connected to the output terminal of one of the expansion microchips and configured to transmit data with the SATA controller by the corresponding expansion microchip.

5. The data transmitting device of claim 4, wherein the SATA module further comprises a connector connected between the front expansion microchip and the SATA controller.

6. The data transmitting device of claim 5, wherein the SATA controller further comprises at least one SATA interface, the connector interface electrically connected to the at least one SATA.

7. The SATA module of claim 4, wherein the SATA device is selected from one of the group consisting of a hard disk and a DVD drive.

8. A serial advanced technology attachment (SATA) module, comprising:

a plurality of expansion microchips, each of the expansion microchips comprising an input terminal, an output terminal, and an expansion terminal; each of the expansion microchips electrically connected in series with the input terminal of one expansion microchip connecting to the expansion terminal of another expansion microchip, the input terminal of a front expansion terminal positioned at a first end of the expansion microchips configured to connect to a SATA controller; and a plurality of SATA devices, each of the SATA devices electrically connected to the output terminal of one expansion microchip and configured transmit data with the SATA controller by the corresponding expansion microchip.

9. The SATA module of claim 8, further comprising a connector connected between the front expansion microchip and the SATA controller.

10. The SATA module of claim 8, further comprising a circuit board, wherein the expansion microchips and the SATA devices are installed on the circuit board.

* * * * *